US008583189B2

(12) United States Patent  
Harris et al.

(10) Patent No.: US 8,583,189 B2  
(45) Date of Patent: Nov. 12, 2013

(54) METHOD AND APPARATUS FOR THE SELECTIVE USE OF IMPERCEPTIBLE INVITES

(75) Inventors: John M. Harris, Chicago, IL (US); Sean S. Kelley, Barrington, IL (US); Anatoly Agulnik, Deerfield, IL (US); Richard L. Bennett, Southlake, TX (US); J. Christopher Stanaway, Wheaton, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1091 days.

(21) Appl. No.: 11/617,091

(22) Filed: Dec. 28, 2006

(65) Prior Publication Data

US 2008/0161062 A1 Jul. 3, 2008

(51) Int. Cl.
  *H04M 1/00* (2006.01)
  *H04B 7/00* (2006.01)
  *H04H 20/71* (2008.01)

(52) U.S. Cl.
  USPC ............................. 455/567; 455/519; 370/312

(58) Field of Classification Search
  USPC .................................................. 455/518, 519
  See application file for complete search history.

(56) References Cited

U.S. PATENT DOCUMENTS

| 5,416,770 | A | * | 5/1995 | Stoner et al. | 370/312 |
|---|---|---|---|---|---|
| 6,477,150 | B1 | * | 11/2002 | Maggenti et al. | 370/312 |
| 6,970,547 | B2 | * | 11/2005 | Andrews et al. | 379/210.01 |
| 2001/0053213 | A1 | | 12/2001 | Truong et al. | |
| 2004/0162096 | A1 | * | 8/2004 | Shaughnessy et al. | 455/518 |
| 2005/0286496 | A1 | * | 12/2005 | Malhotra et al. | 370/352 |
| 2006/0046758 | A1 | * | 3/2006 | Emami-Nouri et al. | 455/518 |
| 2007/0097994 | A1 | * | 5/2007 | Samdadiya et al. | 370/401 |
| 2007/0281723 | A1 | * | 12/2007 | Chotai et al. | 455/518 |

* cited by examiner

*Primary Examiner* — George Eng  
*Assistant Examiner* — Joseph Dean, Jr.

(57) ABSTRACT

A communication device [400] includes a transceiver [405] to receive and transmit data. A message detection element [410] detects at least a first message and a second message in the data received by the transceiver [405]. A processor [400] modifies a state of the communication device [400] based on the first message and the second message. A positive acknowledgement is transmitted in response to the first message comprising a call pending message, and the state is modified to establish a session and inhibit an alerting of a user of the communication device. The state is modified to alert the user of the communication device [400] in response to the second message comprising a call start message.

6 Claims, 6 Drawing Sheets

METHOD AND APPARATUS FOR THE SELECTIVE USE OF IMPERCEPTIBLE INVITES

TECHNICAL FIELD

This invention relates generally to a method, apparatus, and system for the selective use of imperceptible invites in group calls.

BACKGROUND

Group call is a widely used feature in current communication technologies, such as Push To Talk ("PTT") and Push To Experience ("PTX"), that enables an originator to establish a communication session with multiple participants. Certain group calls may require that a set of preconditions be met in order for the group call to proceed, such as a minimum quorum of overall participants, a minimum number of certain types of participants, or specific participants that are required. For example, there may be a situation where at least 90% of group members must participate in a group call for it to proceed. Alternatively, in a business setting there may be a situation requiring that at least a company lawyer, marketer, and accountant participate in the group call in order for the group call to proceed. In another example, there may be a requirement that the Chief Executive Officer ("CEO") participate in the group call in order for it to go forward. Therefore, in the event that the CEO is unable to participate in the group call, the group call cannot take place. Thus, the CEO is said to be a "required" participant in the group call.

The overall group call proceeds only if the set of preconditions are met. In current systems, all of the target devices alert the target users (e.g., by beeping, vibrating, or displaying an icon) immediately when a group call invite is received. This, however, can be very annoying for the target users because there is no guarantee at the time of the alert that the group call will be able to go forward. For example, a required participant may reject the group call invite while others accept, and those who accept are left waiting for a call that fails to proceed, leading to a poor end user experience.

In a number of different scenarios, the targets for a group call, according to current systems, will alert users despite a high likelihood of the group call not proceeding. For example, there is a high likelihood of this happening if there is a minimum quorum of participants necessary or specific participants that are required.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
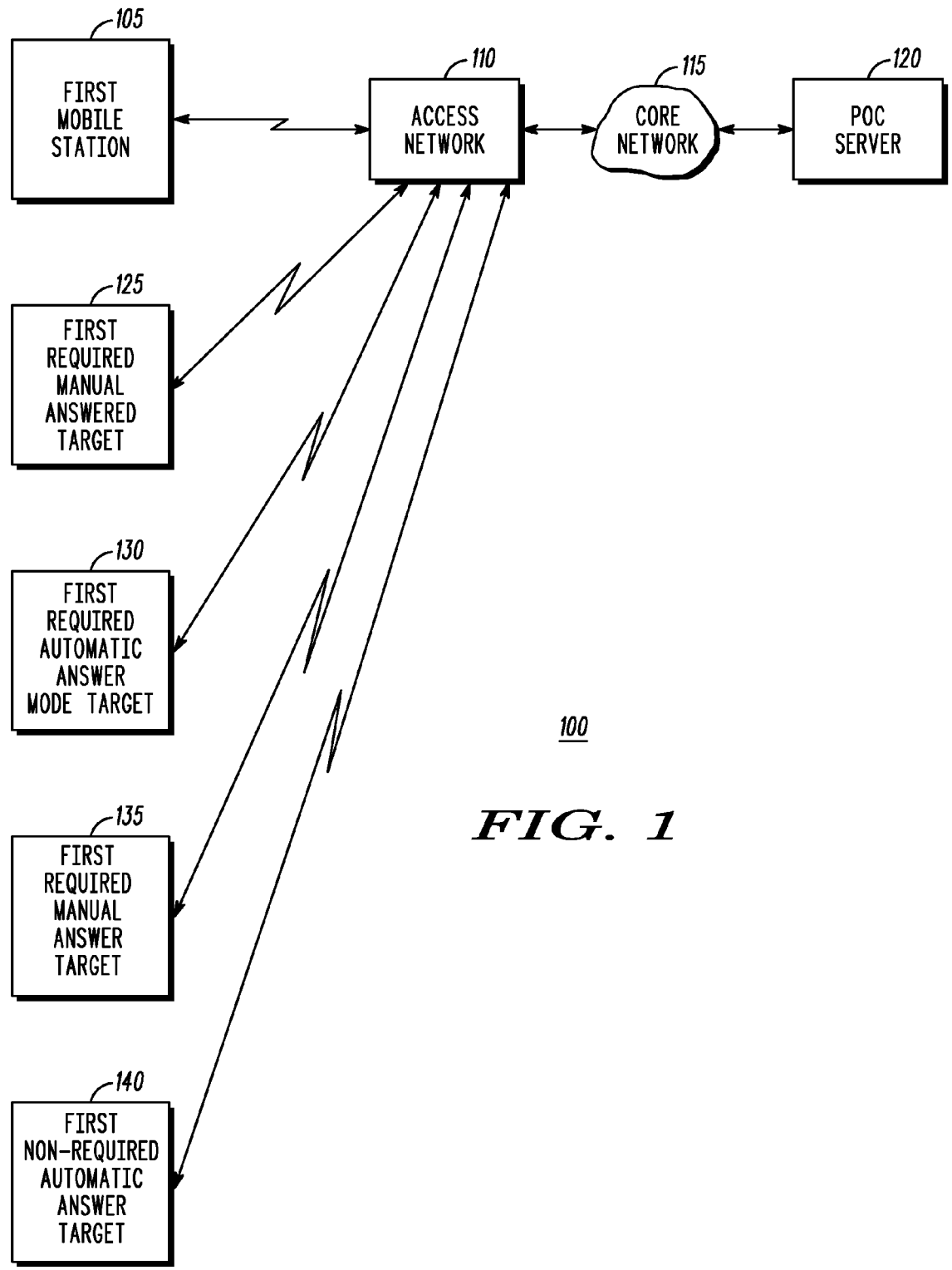
FIG. 1 illustrates a system according to at least one embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Certain group calls may require that a set of preconditions be met in order for the group call to proceed, such as a minimum quorum of overall participants, a minimum number of certain types of participants, or specific participants that are required. In these group calls, one party initiates the sending of group call invites to the members of the group. The group call may proceed once the set of preconditions have been met.

In order for the group call to be approved, the quorum of targets should first be obtained. The quorum may include "required" targets and "non-required" targets. A required target is a target that must participate in the group call. For example, if the group call is for members presenting marketing ideas to the CEO of a company, the CEO may be a required target such that the group call cannot be approved unless the CEO has accepted an invite for the group call. The quorum may also comprise a predetermined minimum threshold percentage or number of non-required targets accepting. A non-required target is a specific target that does not have to accept the group call invite for the group call to proceed. In the event that the group call is for an accounting department of a company, there may be a requirement that 80% of the targets have to accept invites before the group call can proceed.

A "regular" invite is utilized to establish a communication session, but nothing more. The regular invite typically causes a target to audibly beep, a Light Emitting Diode ("LED") on the target to flash, the target to vibrate, or some other perceivable event to occur at the target. The alerting occurs because the target expects that the call will proceed.

An imperceptible or "stealth" invite comprises, e.g., a new Session Initiation Protocol ("SIP"), Push-To-Talk ("PTT"), or application level signaling message that indicates to the target that the call will only proceed if certain preconditions are met. However, the target should still signal its acceptance or rejection of the call, so that the preconditions can be evaluated. The imperceptible invite as described below comprises a "call pending" message. Imperceptible invites avoid alerting the targets in cases where the preconditions are not met, e.g., if there is an insufficient quorum. In one embodiment of the invention, the imperceptible invite is transmitted with an SDP body containing the "a=inactive" attribute indicating media cannot be sent or received by the target, and the target responds with an acceptance such as a "200 OK" message or other indication without generating an alert. The "a=inactive" attribute is detected by a processor of the target upon receipt. A link layer connection is also established with the target, and the target is deterred from placing or accepting a different call.

There are various modes in which a phone may be configured. One such mode is a "manual answer" mode. In the manual answer mode, a user has to manually press a button or perform some other type of action to accept a group call invite, much like the way one would answer a typical telephony call. Another mode is an "automatic answer" mode. In the automatic answer mode, the phone is configured to automatically accept the group call invite.

Because a phone in automatic answer mode will automatically accept the group call invite, an imperceptible invite may be sent to such automatic answer mode target phones. By sending the imperceptible invite to such automatic answer mode targets, the process avoids generating audible noises or other perceivable indications that would annoy such targets. Because they are going to automatically accept such invites anyway, there is no benefit to sending an audible or perceptible invite at this time.

The annoyance to targets caused by sending invites may be minimized by initially sending imperceptible invites to all targets (including both those in automatic answer mode and those in manual answer mode). Each of the automatic answer mode targets respond to the imperceptible invite with an acceptance but do not audibly beep or otherwise show a perceivable indication to the user. The manual answer mode targets, on the other hand, alert the user by, for example, beeping or otherwise indicating receipt of the invite to the user of the target. At this point, the manual answer mode targets are aware of the group call in order to manually respond to the invite request, but automatic answer mode targets are not. A target which is busy in an existing call will also alert the user about the incoming invite, regardless of the configured answer mode. Essentially, this means that a target is in manual answer mode while busy in a call.

In the event that acceptances of the imperceptible invites are received such that the group call preconditions are met, a second message is sent to all users (including the manual answer mode targets) who did not reject the imperceptible invite, and the targets beep or otherwise indicate receipt of the second message. The second message as described above comprises a "call start" message. The originator of the group call receives an indication that the call is proceeding and the group call proceeds as normal. If, however, the group call preconditions are not met, a termination message or indication is sent out to all relevant targets, and a failure message is sent to the originator.

In an alternative embodiment, if it is somehow "known" that certain targets are in manual answer mode, then a regular invite can be sent to these targets right away (to avoid having to send a call pending message followed by a call start message).

The alerting is made when the call start message is received. The targets which received the call pending message always delay the alerting until after the call start message is received. Alternatively, if the target received a regular invite, then the target sometimes delays the beep until a talk burst or certain floor control message is received, based on something that is included in an invite, e.g., a group call indication such that the target delays the beep for all group calls.

The teachings discussed herein also apply to normal telephony, for example, when normal telephony is performed over an instant communication group call similar to a PTT group call except that it is full-duplex and low latency.

FIG. 1 illustrates a system 100 according to at least one embodiment of the invention. As shown, the system 100 includes a first mobile station 105, an access network 110, a core network 115, a PTT Over Cellular ("PoC") server 120, a first required manual answer mode target 125, a first required automatic answer mode target 130, a first non-required manual answer mode target 135, and a first non-required automatic answer mode target 140. It should be appreciated that additional targets may also be present in some embodiments. In the event that a user of the first mobile station 105 desires to initiate a group call, the user may depress a certain button on the first mobile station 105, dial a predetermined phone number, or send the group call initiation request in some way. The first mobile station 105 may have a list of the targets for the group pre-stored in its memory and include in the group call initiation request. Alternatively, the specific number being dialed may be associated with certain targets by the PoC server 120 beforehand. The first mobile station 105 may be a cellular phone, personal computer, or other communication device. The first mobile station 105 transmits the group call initiation request through the access network 110 and core network 115 to the PoC Server 120. The PoC server 120 controls the group call session. The PoC server 120 may be in communication with additional PoC servers. The PoC server 120 may send invites through the core network 115 and the access network 110 to be sent to any targets in communication with the access network 110. The PoC server 120 keeps track of which targets have accepted invites.

FIG. 1 shows all targets connected to one access network. It should be appreciated, however, that there could be multiple access networks, such as Code Division Multiple Access 2000 ("CDMA2000"), Global System for Mobile Communications ("GSM"), and cable. In such an embodiment, the targets can be connected to these various access networks while still following the teachings described herein.

The call pending messages establish a communication session and carry additional semantics to indicate that an application server, such as a PoC server or a Presence Server, is still gathering information to determine if the session will proceed. This may mean that, for example, it is determining whether all required targets will accept the invite. The key attribute of the message is that it conveys a possibility that the session may not proceed, such that no media will be exchanged. It is not necessarily imperceptible because, for example, a target in manual answer mode will still alert the user. The imperceptible aspect is the intelligent behavior in some targets (such as those set to not alert a user if the target is in an automatic answer mode) in response to the possibility that the group call session may not proceed. Intuitively, it is somewhat like putting the session on hold until some further event occurs (such as determining that preconditions for proceeding with the call are met).

Call pending messages originate from the PoC server 120, because it is the only entity that knows whether "quorum" has been reached (e.g., all required participants, and/or a minimum number of participants). The PoC server 120 knows what the preconditions are for the group call to proceed, based on information received in the group call initiation request and/or preconfigured attributes of the group. The PoC server 120 may also know the answer mode setting of the targets.

For manual answer targets that receive a call pending message, the initial alerting may sound different than a normal manual answer call, because it is "are you available?" rather than "incoming call." The subsequent alerting triggered by the call start message may be more assertive to indicate "incoming call." This works especially well when most/all targets are automatic answer mode (presumably the typical case for PTT).

In the PoC group call, as discussed below, if at least some targets are "required" or some minimum number of participants is required, the PoC server 120 sends call pending messages to all users. In one embodiment, the call pending message is a Session Initiation Protocol ("SIP") INVITE request with the "a=inactive" attribute in a Session Description Protocol ("SDP") offer. Automatic answer mode targets respond with the "a=inactive" attribute in an SDP answer contained in the body of an acceptance message (e.g., a SIP 200 OK response), and do not alert the user in a manner indicating that an incoming call is proceeding. Manual answer targets, on the other hand, alert the user, and if accepted, respond as above.

At this point, users of the manual answer targets are aware of group call invite, but users of the automatic answer targets are not. If the PoC server 120 receives acceptance messages from all required targets or the required minimum number of targets, then the PoC server 120 sends call start messages to all users who have not rejected the group call. In one embodiment, the call start message is a Session Initiation Protocol ("SIP") INVITE request or UPDATE request with the "a=sendrecv" attribute in an SDP offer. All targets respond with the "a=sendrecv" attribute in an SDP answer contained in body of acceptance message (e.g., a SIP 200 OK response), and beep or otherwise make an indication to the user if they have not already done so. The total number of messages/invites sent may be reduced if the PoC server 120 only sends call pending messages to automatic answer targets, and call start messages or normal invites to manual answer targets. This avoids sending two messages to manual answer targets. The PoC server 120 sends a call successful message to the originator, grants floor, and the group call proceeds as normal. If the PoC server 120 does not receive acceptance messages from all required participants or the minimum number of participants, then the PoC 120 server sends a call termination message to all relevant targets, and gives a call failure response to originator to indicate that the group call has failed.

Figure 2:
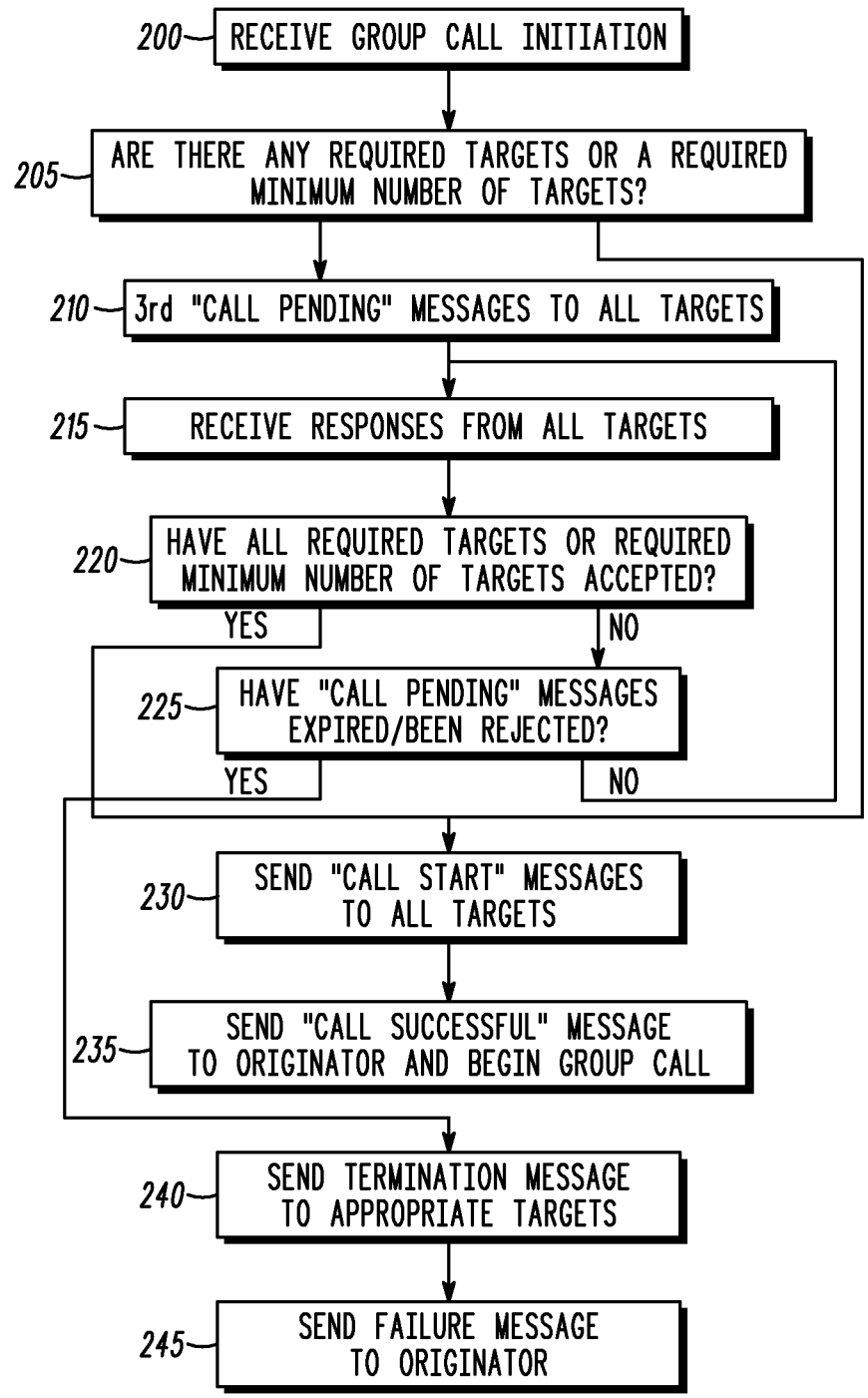
FIG. 2 illustrates a method of sending out invites for a group call according to at least one embodiment of the invention.

FIG. 2 illustrates a method of sending out messages/invites for a group call according to at least one embodiment of the invention. First, at operation 200, a group call initiation request is received from an originator. With respect to the embodiment shown in FIG. 1, the first mobile station 105 is the originator. The group call initiation request is transmitted from the first mobile station 105 through the access network 110 and core network 115 to the PoC Server 120. Next, at operation 205, a determination is made as to whether there are any required targets in the group member list or a required minimum number of targets. This determination may be made by, for example, a processor within, or in communication with, the PoC server 120. If "yes" at operation 205, processing proceeds to operation 210 where call pending messages are sent to all targets. The reason why call pending messages are sent to all of the targets is because the PoC server 120 may not know which of the targets are using manual answer mode and which are using automatic answer mode. If "no" at operation 205, on the other hand, processing proceeds to operation 230. At operation 215 responses are received from the required targets. Next, at operation 220, a determination is made as to whether all required targets or the required minimum number of targets have accepted their call pending messages. If "no," processing proceeds to operation 225. If "yes," processing proceeds to operation 230. At operation 225, a determination is made as to whether any of the call pending messages have expired or been rejected. If "yes," processing proceeds to operation 240. If "no," processing returns to operation 215 where the PoC server 120 waits to receive more responses. At operation 230, call start messages or regular invites are transmitted to all of the targets who have not rejected the call, including both the required and the non-required targets. As discussed above, the call start messages or regular invites do not have the restriction on sending and receiving media that the call pending messages include. Processing subsequently proceeds to operation 235 where the PoC server 120 sends a call successful message to the group call originator and the group call begins.

At operation 240, a termination message is sent to the appropriate targets. The targets being sent the termination message include those that have already accepted the call pending message. Finally, at operation 245, a call failure message is sent to the originator of the group call initiation.

The method described with respect to FIG. 2 is generally for an embodiment where the PoC server 120 does not know which of the targets are in manual answer mode and which are in automatic answer mode. In an alternative embodiment where the mode of each of the targets is known, the invites can be sent out more efficiently by sending regular invites right away to the manual answer mode targets and call pending messages only to the automatic answer mode targets.

Figure 3:
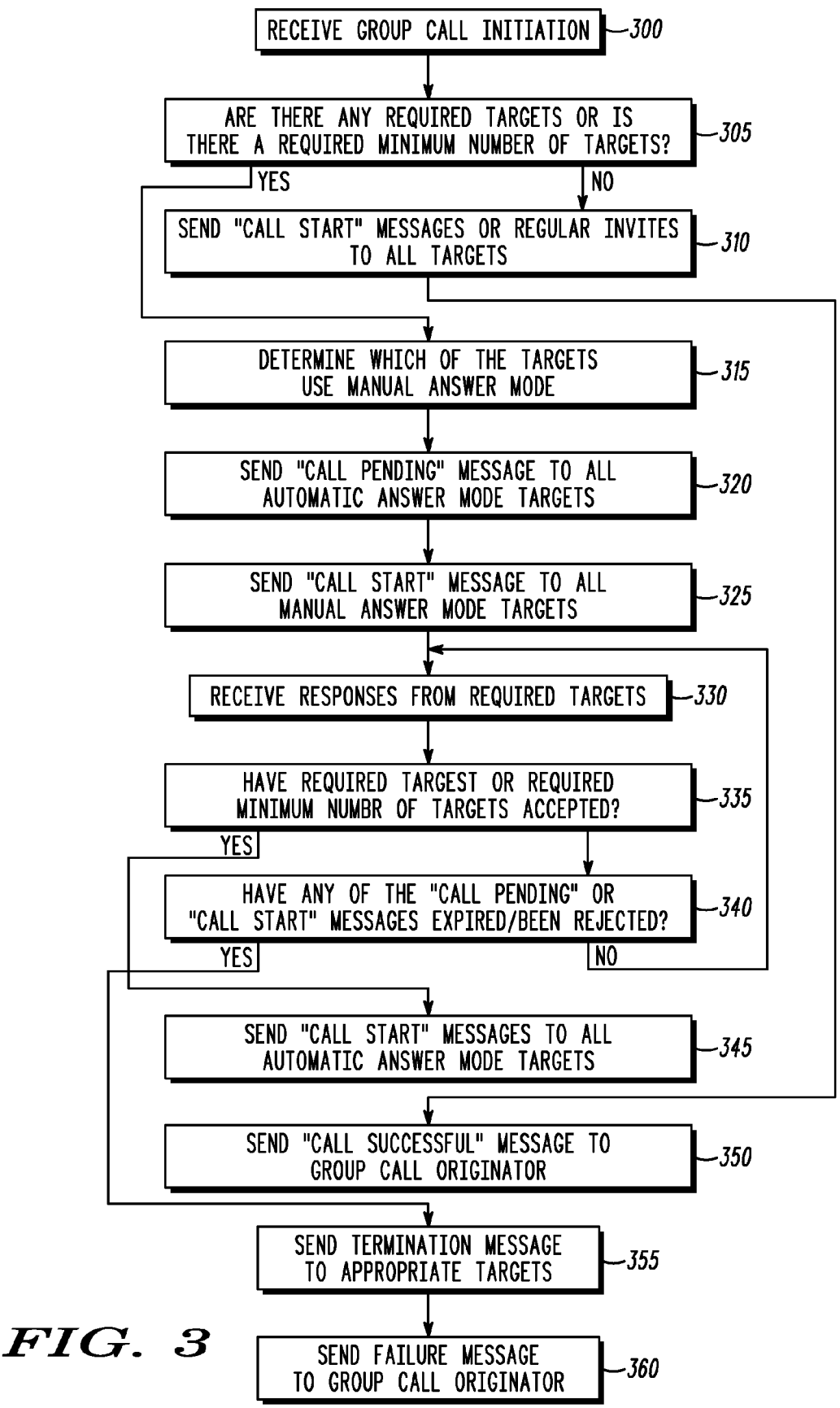
FIG. 3 illustrates a method of sending out invites for a group call where a status of whether a particular target uses manual answer mode or automatic answer mode is known according to at least one embodiment of the invention.

FIG. 3 illustrates a method of sending out messages/invites for a group call where a status of whether a particular target uses manual answer mode or automatic answer mode is known according to at least one embodiment of the invention. First, at operation 300, a group call initiation request is received. As with the method of FIG. 2 discussed above, the group call initiation request may be transmitted by the first mobile station 105 of FIG. 1 through the access network 110 to the PoC server 120. Referring again to FIG. 3, a determination is made as to whether there are any required targets in the group member list or a required minimum number of targets at operation 305. If "yes," processing proceeds to operation 315. If "no," on the other hand, call start messages or regular invites are sent to all targets at operation 310 and then processing proceeds to operation 350. At operation 315, a determination is made regarding which of the targets use manual answer mode. This determination may be based on information stored in the PoC server 120 or accessible by the PoC server 120. This information may be determined when each of the targets initially connect to their respective wireless networks and report their answer mode setting.

At operation 320, call pending messages are sent to all automatic answer mode targets. Next, call start messages or regular invites are sent to all manual answer mode targets. It should be appreciated that operation 325 may occur prior to operation 320 in some embodiments. At operation 330, responses are received from the required targets. A determination is subsequently made at operation 335 of whether all required targets or required minimum number of targets have accepted their respective call pending or call start messages. If "yes," processing proceeds to operation 345. If "no," on the other hand, processing proceeds to operation 340 where a determination is made as to whether any of the call pending or call start messages has expired or been rejected. If "yes," process proceeds to operation 355 and the group call fails. If "no," processing returns to operation 330. At operation 345, call start messages are sent to all automatic answer mode targets. No invites need to be sent to the manual answer targets at this time because they were already sent at operation 325. At operation 350, PoC server 120 sends a call successful message to the group call originator and the group call proceeds.

At operation 355, a termination message is sent to the appropriate targets. The targets being sent the termination message include those that have already accepted the call pending message. Finally, at operation 360, a call failure message is sent to the originator of the group call initiation.

The methods described above in FIGS. 2 and 3 both permit group calls to be allowed when all required targets accept their invites. However, in other embodiments, the group call is only allowed if all required targets accept and there is at least a minimum number of overall targets that have accepted their messages/invites. It should be appreciated the order of some of the operations performed in FIGS. 2 and 3 may be changed in some embodiments.

Figure 4:
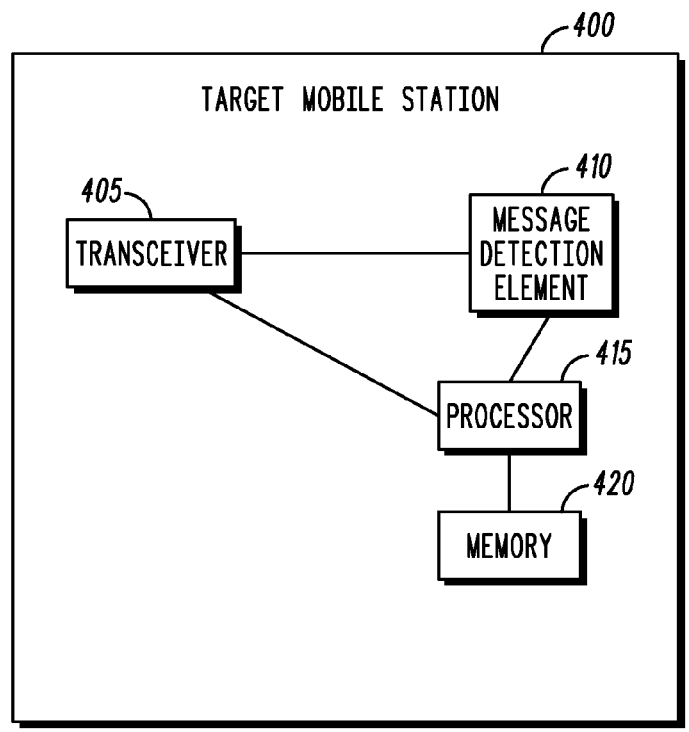
FIG. 4 illustrates a target mobile station according to at least one embodiment of the invention.

FIG. 4 illustrates a target mobile station 400 according to at least one embodiment of the invention. As shown, the target mobile station includes a transceiver 405, a message detection element 410, a processor 415, and a memory 420. The transceiver 405 receives communications from an access network and transmits communications to the access network. The message detection element 410 analyzes a communication received by the transceiver. In the event that an invite is received, the message detection element analyzes the invite to determine whether a call pending or call start indication is included. For example, the invite may contain an SDP body with the "a=inactive" or the "a=sendrecv" attribute.

The "a=inactive" attribute prevents the target mobile station 400 from sending and receiving media. Also, if the target mobile station 400 is in automatic answer mode, it prevents the target mobile station 400 from notifying a user of the target mobile station in a perceivable way that the message/invite has been received.

If on the other hand, the target mobile station uses the manual answer mode, receipt of the "a=inactive" attribute would not prevent the target mobile station from beeping or otherwise notifying the user of receipt of the message/invite. Instead, because it is in the manual answer mode, the target mobile station has to notify the user in order for the user to accept or refuse the invite. However, the manual answer mode target will, as with those in automatic answer mode, prevent media from being sent or received upon receipt of the "a=inactive" attribute.

Regardless of whether the target mobile station uses the manual answer mode or the automatic answer mode, receipt of the "a=sendrecv" permits the target mobile station 400 to send and receive media. It also allows the target mobile station 400 to notify the user of the target mobile station in a perceivable way that the message/invite has been received.

The processor 415 of the target mobile station may be utilized to control the notifying of the user, and to inhibit or allow the sending and receiving of media in response to receiving the control attribute. The memory 420 may be utilized to store instruction code to be executed by the processor 415.

Figure 5:
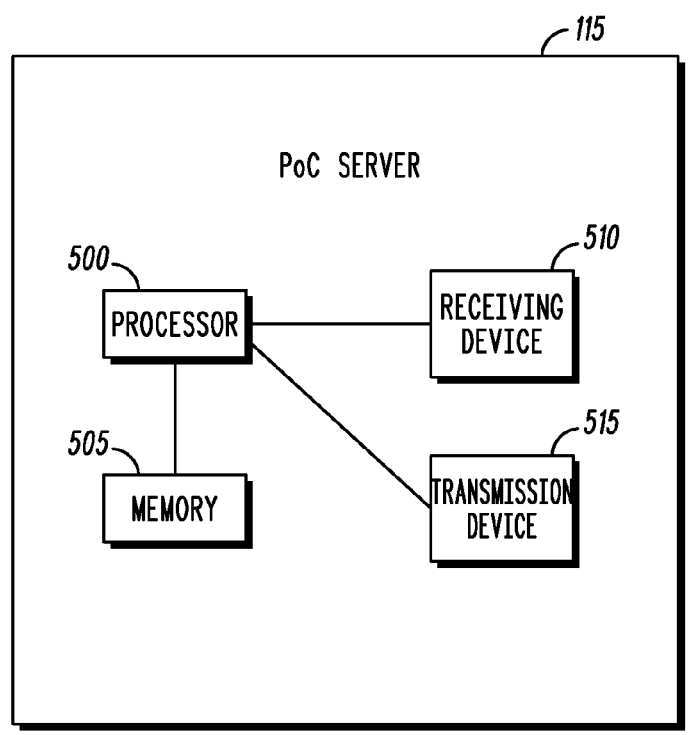
FIG. 5 illustrates a PoC server according to at least one embodiment of the invention.

FIG. 5 illustrates a PoC server 120 according to at least one embodiment of the invention. As shown, the PoC server 120 includes a processor 500, a memory 505, a receiving device 510, and a transmission device 515. The memory 505 may store instruction code to be executed by the processor 500. The memory 505 may also store a list of the identities of targets of a group, as well as information relating to an operating mode of each of the targets, such as whether they use the manual answer mode or automatic answer mode. The receiving device 510 receives the group call initiation. The transmission device 515 sends invites to group members. The invites are sent to the group targets through the relevant access networks.

Figure 6:
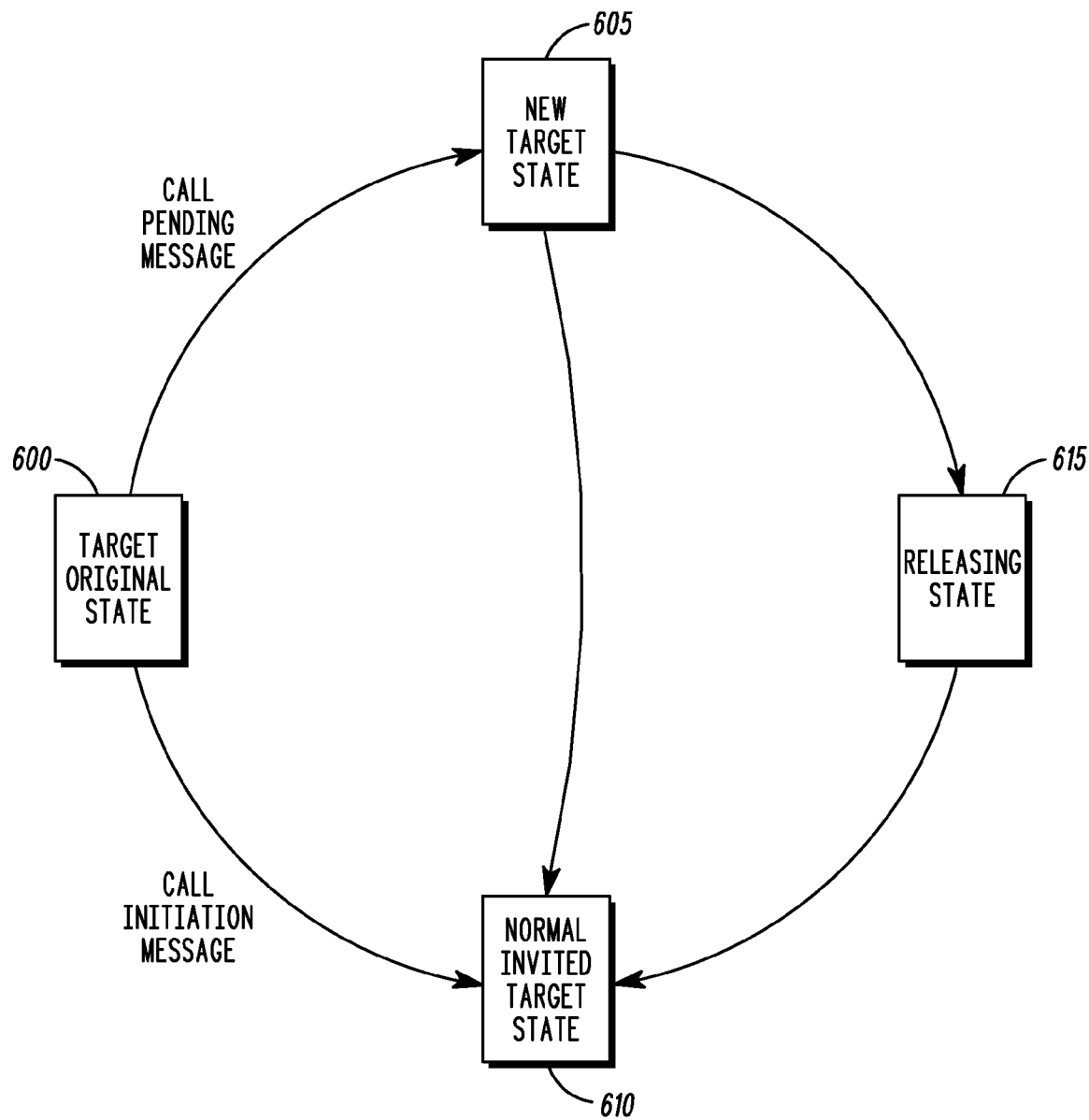
FIG. 6 illustrates a state diagram for a target mobile station of a group call invite according to at least one embodiment of the invention.

FIG. 6 illustrates a state diagram for a target mobile station of a group call message/invite according to at least one embodiment of the invention. Initially the target is in its original state 600, which may also be known as a "start-stop" state in the Open Mobile Alliance ("OMA") PoC User Plane Specification, OMA-TS-PoC-UserPlane-V1_0-20060609-A. In the event that a call pending message is received, the state of the target transitions to a new state 605. The target may also receive a call start message or regular invite while in the original state 600, and this would cause its state to transition to the normal invited target state 610, also known as a "U: has no permission" state in OMA-TS-PoC-UserPlane-V1_0-20060609-A. This state is part of the OMA Push-to-talk Over Cellular (PoC). OMA describes the PoC Service as a two-way form of communications that allows users to engage in immediate communication with one or more users. POC service is similar to a "walkie-talkie" application in the way that by pressing a button a talk session with an individual user or a broadcast to a group of participants is initiated. Receiving participants hear the sender's voice either without any action on their part (auto-answer mode), or may be notified and has to accept the call (manual answer mode) before listening to the sender's voice. The communication is half-duplex, meaning that one person can talk at a time and all other participants hear the speech. The permission for talk right granting is controlled via the floor control mechanism.

The "U: has no permission" state is a stable state and a target mobile station uses this state when it is not sending Real-Time Transport Protocol ("RTP") media packets or is not waiting for a Talk Burst Control Protocol ("TBCP") message response. In this state, the target mobile station may receive RTP media packets or TBCP Talk Burst Control messages.

The new state 605, also know as "U: pending session proceed" differs from the normal invited target state 610 in that it conveys a possibility that the next transition will be to a "releasing" state 615 (for example, call will not proceed). In previous systems, the target is generally alerted when it enters the normal invited target state 610. However, prior systems do not insert a new target state 605 prior to this where the call is established but the target is not alerted under certain conditions.

According to an embodiment of the invention, the target receives an invite message with a call pending indication, such as an SDP attribute that does not allow media exchange (e.g., "a=inactive"), and transitions to a new target state 605. The "session proceed" is then a re-invite message or update message with an SDP attribute that enables bi-directional media (e.g., "a=sendrecv"). In this embodiment, the invite carries an explicit indication that the target should transition to the new state and wait for the regular invite before going to prior art state. If the target receives a regular invite, then it goes directly to the normal invited target state 610 and bypasses the new target state 605.

In alternative embodiments, the target may receive other types of messages/indications to indicate that the target is not to alert the user. For example, the indication may comprise a call pending indication in a Session Initiation Protocol ("SIP") header. Alternatively, the indication may comprise an SDP body disallowing media exchange or a group call indication.

Figure 7:
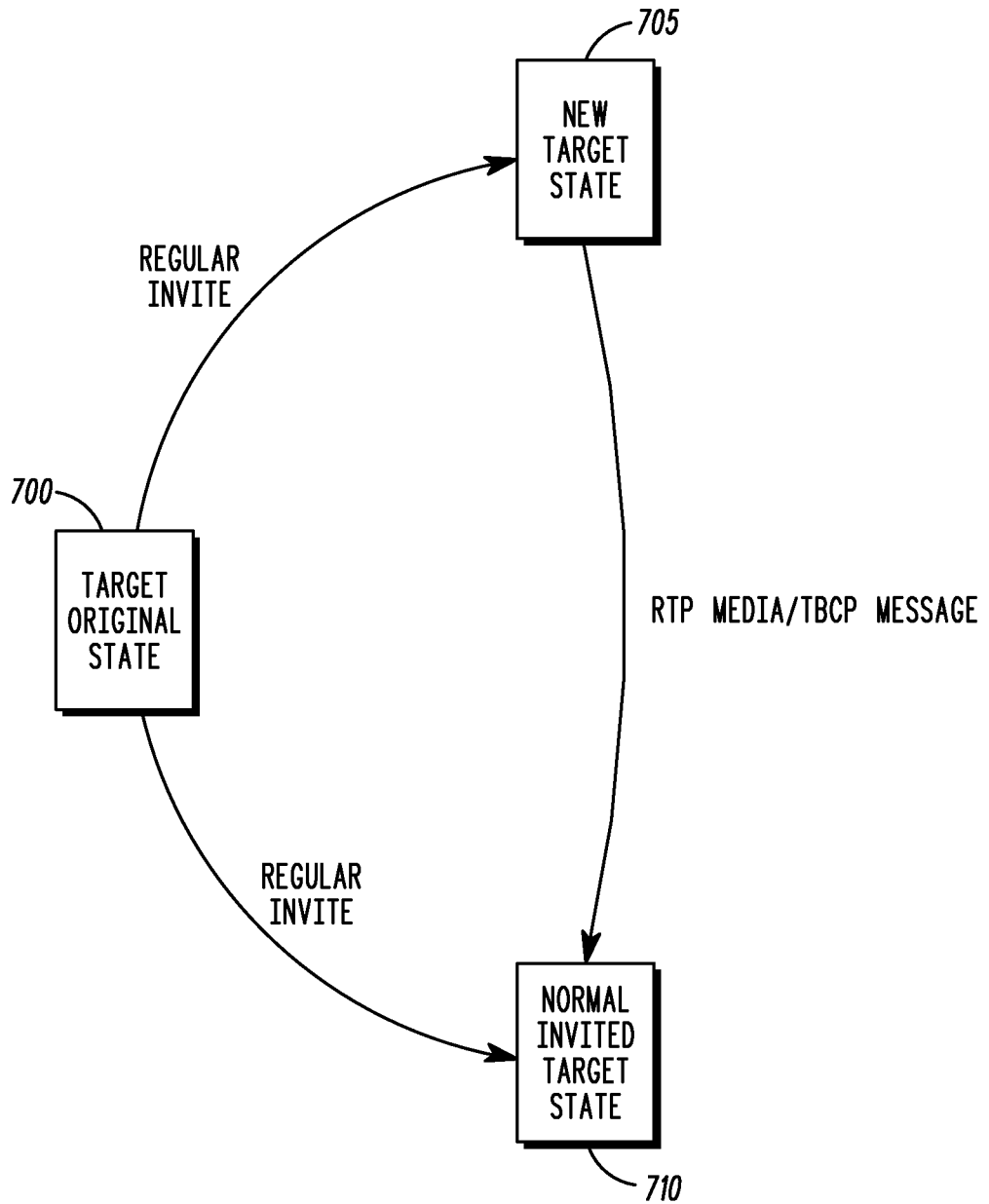
FIG. 7 illustrates a state diagram for a target mobile station of a group call invite according to at least one embodiment of the invention.

FIG. 7 illustrates a state diagram for a target mobile station of a group call invite according to at least one embodiment of the invention. According to this embodiment, the target receives a regular invite and transitions from an original state 700 to the new target state 705. Then, it proceeds to the normal invited target state 710 after receiving an RTP media packet or TBCP message. An advantage of this embodiment is that the call pending message is not needed. According to this embodiment, the target intelligently decides between the new target state 705 and the normal invited target state 710 based on information already available in the invite (for example, if the target determines it is a group call then it goes to the new target state 705, otherwise go to the normal invited target state 710). In other words, the mobile station may assume that a group call may not proceed, whereas a 1-to-1 call will always proceed. A call pending message might carry some additional flag (for example, in a SIP header) that indicates the "higher likelihood that call will not proceed," so that the target transitions to the new target state 705 if the flag is present, or to the old state otherwise.

These teachings described herein apply to Plain Old Telephone systems ("POTs"), PTT, PTX, and text messaging both with and without video. These teachings are directed to a method where a group call initiation request is received for a group comprising at least a first target set of communication devices. A call pending message is transmitted to the first target set of communication devices. A call start message is transmitted to the first target set of communication devices in response to a quorum of the first target set of communication devices and a remaining set of communication devices being achieved.

The method may also comprise transmitting a call initiation message to the remaining set of communication devices of the group. An alert may be inhibited from occurring at automatic answer mode targets of the first target set of communications devices in response to the automatic answer mode targets receiving the call pending message. The alert may be allowed to occur at the automatic answer mode targets of the first target set of communication devices in response to the automatic answer mode targets receiving the call start message.

The first target set of communication devices and the remaining set of communication devices may be determined based on one of information in the group call initiation request, and pre-configured attributes of the group. The first target set of communication devices comprises automatic answer mode targets, and the remaining set of communication devices comprises manual answer mode targets.

A call termination message may be sent to at least one of the communication devices of the first target set of communication devices, and a call failure message to an originator of the group call initiation request, in response to the quorum not being achieved. The quorum may comprise at least one of: (a) a minimum number of the communication devices of the first target set and the remaining set responding with a positive acknowledgement to the call pending message; and (b) specific communication devices of the first target set and the remaining set responding with the positive acknowledgement to the call pending message.

The call pending message may comprise a Session Initiation Protocol ("SIP") invite message with a Session Description Protocol ("SDP") body disallowing media exchange, and the call start message may comprise one of an SIP re-invite message with an SDP body allowing media exchange and a SIP update message with an SDP body allowing media exchange. The call pending message may comprise one of a Session Initiation Protocol ("SIP") invite message with a call pending indication in a SIP header and an SIP invite message with a call pending indication in a Session Description Protocol ("SDP") body, and the call start message may comprise one of a SIP invite message with a call start indication in a SIP header and an SIP invite message with a call start indication in a SDP body and a Real-Time Transport Protocol ("RTP") message and a Talk Burst Control Protocol ("TBCP") message.

The teachings discussed herein are also directed to a communication device. The communication device includes a transceiver to receive and transmit data. A message detection element detects at least a first message and a second message in the data received by the transceiver. A processor modifies a state of the communication device based on the first message and the second message. A positive acknowledgement is transmitted, and the state is modified to establish a session and inhibit an alerting of a user of the communication device in response to the first message comprising a call pending message. The state is modified to alert the user of the communication device in response to the second message comprising a call start message. The inhibiting the alerting in response to the first message may occur only in response to the communication device being in an automatic answer mode.

The processor may be adapted to inhibit until detecting the second message an alerting of a user of the communication device in response to an indication in the first message. The indication may comprise at least one of (a) a call pending indication in a Session Initiation Protocol ("SIP") header; (b) a call pending indication in a Session Description Protocol ("SDP") body; (c) a SDP body disallowing media exchange; and (d) a group call indication.

The first message may comprise a Session Initiation Protocol ("SIP") invite message with a Session Description Protocol ("SDP") body disallowing media exchange, and the second message comprises one of an SIP re-invite message with a SDP body allowing media exchange and a SIP update message with an SDP body allowing media exchange.

The first message may comprise one of (a) a Session Initiation Protocol ("SIP") invite message with a call pending indication in a SIP header, (b) a SIP invite message with a group call indication, and the second message comprises one of Real-Time Transport Protocol ("RTP") message and a Talk Burst Control Protocol ("TBCP") message.

These teachings are further directed to a server. The server includes a receiving device to receive a group call initiation request for a group comprising at least a first target set of communication devices. A transmission device (a) sends a call pending message to the first target set of communication devices, and optionally sends a call initiation message to a remaining set of communication devices of the group; and (b) send a call start message to the first target set of communication devices in response to a quorum of the first target set of communication devices and the remaining set of communication devices being achieved. The transmission element may be adapted to send a call initiation message to a remaining set of communication devices of the group.

The server may include a processor to determine the first target set of communication devices and the remaining set of communication devices based on one of information in the group call initiation request, and pre-configured attributes of the group. The first target set of communication devices may comprise targets in automatic answer mode, and the remaining set of communication devices may comprise targets in manual answer mode.

The transmission device may be adapted to send a call termination message to at least one of the communication devices of the first target set, and a call failure message to an originator of the group call initiation request, in response to the quorum not being achieved.

In addition to the embodiments described above or independent of the embodiments described above, some alternative embodiments are also envisioned. Unlike some embodiments in which a call is automatically started when a certain number of communication devices or a particular set of communication devices is able to participate in the call, in certain other embodiments, a reachability of wireless targets is determined and then indicated to a requesting device to allow a user to determine whether or not to initiate a call.

Thus, one method to provide this sort of functionality is described as follows. A reachability request is received from a communication device. This request indicates at least one wireless communication target for which a reachability determination is requested. (For example, to trigger this request a user of the device might select a talkgroup, a private call target or a list of targets, in the case of selective dynamic group call, and then press a button.) In response to such a reachability request, an ability of the at least one wireless communication target to participate in a new call is determined. Before starting (i.e., without starting, at this point) a call between the communication device and the at least one wireless communication target, the determined reachability of the at least one wireless communication target is indicated to the communication device.

Using this information, a user of the communication device may then decide to initiate a call. A group call initiation request, for example, may then be received from the communication device for a group comprising the at least one wireless communication target.

To determine the ability of the at least one wireless communication target to participate in a potential call, a communication infrastructure network or an access network, for example, may send a ping (e.g., a page) to one or more of the wireless communication targets of the at least one wireless communication target. In some embodiments, targets will respond to the ping automatically, perhaps even regardless of user preferences to the contrary (such as being in a manual mode). The targets may also respond without informing the user of the ping/page, in contrast to typical target behavior after receiving an invite.

Instead of pinging, the network may instead determine whether one or more of the wireless communication targets is busy in a call or has recently (in the past few seconds, e.g.) transmitted signaling to the network. In some embodiments, the targets are pinged unless they are known by the network to have recently transmitted signaling or to already be busy in communication. In addition, in some embodiments, targets may continue to be pinged for a period until they respond. Once they finally do respond, the requesting communication device may be notified of their change in reachability.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A communication device, comprising:
   a transceiver adapted to receive and transmit data;
   a message detection element adapted to detect at least a first message indicating that a call is pending and a second message indicating that the call is starting in the data received by the transceiver;
   a processor adapted to modify a state of the communication device based on the first message and the second message, wherein
      in response to receiving the first message indicating that the call is pending, the communication device transmitting a positive acknowledgement, and modifying the state to establish a session and inhibit an alerting of a user of the communication device; and
      in response to the second message indicating that the call is starting, the communication device modifying the state to alert the user of the communication device.

2. The communication device of claim 1, the processor being adapted to inhibit the alerting of a user of the communication device, until detecting the second message, in response to an indication in the first message, the indication comprising at least one of:
   a call pending indication in a Session Initiation Protocol ("SIP") header,
   a call pending indication in a Session Description Protocol ("SDP") body,
   an SDP body disallowing media exchange, and
   a group call indication.

3. The communication device of claim 1, wherein the inhibiting the alerting in response to the first message occurs only in response to the communication device being in an automatic answer mode.

4. The communication device of claim 1, wherein the first message comprises a Session Initiation Protocol ("SIP") invite message with a Session Description Protocol ("SDP") body disallowing media exchange, and the second message comprises one of an SIP re-invite message with a SDP body allowing media exchange and a SIP update message with an SDP body allowing media exchange.

5. The communication device of claim 1,
   wherein the first message comprises one of a Session Initiation Protocol ("SIP") invite message with a call pending indication in a SIP header, an SIP invite message with a call pending indication in a Session Description Protocol ("SDP") body, and an SIP invite message with a group call indication; and
   wherein the second message comprises one of Real-Time Transport Protocol ("RTP") message and a Talk Burst Control Protocol ("TBCP") message.

6. The method of claim 1 wherein the first message indicating that a call is pending disallows media transmission or reception by the communication devices and wherein the second message indicating that the call is starting allows media transmission or reception by the communication device.

* * * * *